(12) United States Patent
Pigliapoco et al.

(10) Patent No.: US 10,344,893 B2
(45) Date of Patent: Jul. 9, 2019

(54) JOINING DEVICE OF A CONTINUOUS CONDUIT FOR CHANGES IN SLOPE OF SEABEDS, CONTINUOUS CONDUIT COMPRISING A DEVICE AND METHOD FOR JOINING A CONTINUOUS CONDUIT

(71) Applicant: SAIPEM S.P.A., San Donato Milanese, Milan (IT)

(72) Inventors: Mauro Pigliapoco, Milan (IT); Giovanni Profeta, Milan (IT)

(73) Assignee: SAIPEM S.P.A., San Donato, Milanese, Milan (IT)

( * ) Notice: Subject to any disclaimer, the term of this patent is extended or adjusted under 35 U.S.C. 154(b) by 0 days.

(21) Appl. No.: 15/746,353

(22) PCT Filed: Jul. 14, 2016

(86) PCT No.: PCT/IB2016/054198
§ 371 (c)(1),
(2) Date: Jan. 19, 2018

(87) PCT Pub. No.: WO2017/013541
PCT Pub. Date: Jan. 26, 2017

(65) Prior Publication Data
US 2018/0216752 A1 Aug. 2, 2018

(30) Foreign Application Priority Data
Jul. 21, 2015 (IT) .................. 102015000036216

(51) Int. Cl.
*F16L 1/26* (2006.01)
*F16L 1/16* (2006.01)
(Continued)

(52) U.S. Cl.
CPC ............. *F16L 1/123* (2013.01); *F16L 1/16* (2013.01); *F16L 1/19* (2013.01); *F16L 1/26* (2013.01); *F16L 1/18* (2013.01)

(58) Field of Classification Search
CPC ...... F16L 1/12; F16L 1/16; F16L 1/161; F16L 1/26
(Continued)

(56) References Cited

U.S. PATENT DOCUMENTS 3,658,366 A * 4/1972 Welch, Jr. .......... E21B 43/0107
285/147.1
3,733,676 A * 5/1973 Morgan .................. F16L 1/26
29/407.05
(Continued)

FOREIGN PATENT DOCUMENTS

| WO | 03/012327 A1 | 2/2003 |
|---|---|---|
| WO | 2011/008704 A1 | 1/2011 |
| WO | 2014/041359 A2 | 3/2014 |
| WO | 2015/034267 A1 | 3/2015 |

OTHER PUBLICATIONS

International Search Report and Written Opinion of the International Searching Authority for corresponding International Patent Application No. PCT/IB2016/054198 dated Nov. 2, 2016, 8 pages.

*Primary Examiner* — Frederick L Lagman
(74) *Attorney, Agent, or Firm* — Merchant & Gould P.C.

(57) ABSTRACT

A joining device of a continuous conduit is for changes in slope of seabeds. The continuous conduit defines a longitudinal direction substantially coinciding with the longitudinal direction of structural development of the continuous conduit. The continuous conduit has a longitudinal structural continuity and a fluidic continuity. The joining device includes a joint that includes at least one first joining branch, at least one second joining branch and at least one third joining branch. The first joining branch extends along the longitudinal direction and provides longitudinal structural
(Continued)

and fluidic continuity of the continuous conduit and connects with a piece of the continuous conduit. The second joining branch provides longitudinal structural continuity of the continuous conduit. The third joining branch provides fluidic continuity of the continuous conduit. The second joining branch is exclusively suitable for providing the longitudinal structural continuity of the continuous conduit, and is unsuitable for providing the fluidic continuity.

21 Claims, 8 Drawing Sheets

(51) Int. Cl.
      *F16L 1/12*      (2006.01)
      *F16L 1/19*      (2006.01)
      *F16L 1/18*      (2006.01)

(58) Field of Classification Search
      USPC .......................................... 405/169, 170, 172
      See application file for complete search history.

(56) References Cited

U.S. PATENT DOCUMENTS

| | | | | |
|---|---|---|---|---|
| 4,310,263 A | * | 1/1982 | Daughtry | F16L 1/26 166/341 |
| 4,525,101 A | * | 6/1985 | Stevens | F16L 1/26 405/169 |
| 5,192,166 A | * | 3/1993 | Persson | F16L 1/16 405/167 |
| 6,142,708 A | * | 11/2000 | Tarlton | E21B 43/013 166/341 |
| 6,595,725 B1 | | 7/2003 | Shotbolt | |
| 7,819,608 B2 | | 10/2010 | Joshi et al. | |
| 7,963,721 B2 | | 6/2011 | Joshi et al. | |
| 8,425,154 B1 | * | 4/2013 | Lugo | F16L 1/26 166/347 |
| 8,449,221 B1 | * | 5/2013 | Lugo | F16L 1/26 405/169 |
| 2006/0062635 A1 | | 3/2006 | Mungall et al. | |
| 2012/0298245 A1 | * | 11/2012 | Dupre | F16L 1/26 138/106 |
| 2014/0044489 A1 | | 2/2014 | Critsinelis et al. | |

* cited by examiner

JOINING DEVICE OF A CONTINUOUS CONDUIT FOR CHANGES IN SLOPE OF SEABEDS, CONTINUOUS CONDUIT COMPRISING A DEVICE AND METHOD FOR JOINING A CONTINUOUS CONDUIT

This application is a National Stage Application of PCT/IB2016/054198, filed 14 Jul. 2016, which claims benefit of Ser. No. 102015000036216, filed 21 Jul. 2015, and which applications are incorporated herein by reference. To the extent appropriate, a claim of priority is made to each of the above disclosed applications.

BACKGROUND OF THE INVENTION

Field of the Invention

The present invention relates to a joining device of a continuous conduit for changes in slope of seabeds, for example underwater seabeds or beds of basins or lakes, and also a continuous conduit comprising said device, and also a joining method of a continuous conduit.

Continuous conduits are generally known, obtained by welding pieces of conduit in series, generally equal to twelve meters long, which are lowered into a water mass and laid on the seabed, in which each of said pieces is suitable for providing the fluidic continuity of the continuous conduit, and simultaneously consists of an element suitable for providing the longitudinal structural continuity of the continuous conduit, that is along the direction of development of the continuous conduit. The term "longitudinal structural continuity" does not mean a path of the forces in rectilinear direction, but a path of the forces which continues along the continuous conduit even when said continuous conduit follows a curved path.

In operating conditions, a continuous conduit of the type described above may be subjected to further stresses which are added to the stresses of longitudinal structural continuity, such as for example dynamic stresses generated by the interaction with the underwater environment such as underwater currents and swirling, and also dynamic stresses generated by the motion of fluid inside the conduit, and also thermal stresses originating from the variation in temperature of the fluid flowing inside the continuous conduit, and also static loads such as the weight of the fluid inside the continuous conduit and the weight of the stretch of conduit itself, and also static loads induced by the pressure of the fluid inside the conduit and by the water outside the conduit itself, and also the stresses generated by the mechanical constraints of the stretch of conduit.

Said stresses may be amplified if the continuous conduit develops along a longitudinal path which is anything but rectilinear, for example when the continuous conduit adheres to a profile of seabed which has changes in slope, such as crests and recesses.

In particular, it is highly important that said longitudinal path of the continuous conduit is adapted to avoid the formation of localized bends (phenomenon known as "kinking"), which cause a reduction of the section of conduit for the passage of fluid, at which an amplification effect of the stresses, or stress concentration, may be generated, resulting in localizing such high concentrated stresses so as to compromise the structural integrity of the conduit itself, in operating conditions.

Background Art

Solutions traditionally used for managing modest changes in slope of the seabed comprise flattening crests or filling recesses.

When the profile of the seabed has changes in slope so as to make said traditionally used solutions ineffective or inapplicable, it is common practice to implement solutions which allow the continuous conduit to extend in longitudinal direction according to a path which is different from the profile of the seabed, such as for example the installation of supports and/or rests for the continuous conduit along the slope of underwater escarpments, or the use of floating buoys anchored to the seabed which are capable of supporting in suspension pieces of continuous conduit, as is known for example from document U.S. Pat. No. 6,595,725B1.

Moreover, solutions are known from documents U.S. Pat. Nos. 7,963,721B2, 7,819,608B2 and US20060062635A1 which by using floating elements in conjunction with flexible joints interposed between successive pieces of continuous conduit, are capable of keeping a flexible portion of continuous conduit suspended, thus giving it a deformed configuration which is suitable for overcoming a change in slope. Flexible joints of this type are known for example from document WO2011008704A1.

However, although they are partially advantageous, such solutions do not completely resolve the problem because the stresses acting on such a suspended stretch of the continuous conduit limit the length thereof, thus making continuous conduits of the type described above unsuitable for managing seabeds comprising escarpments in which changes in slope are associated with a long inclined slope. Indeed by increasing the length of the stretch of continuous conduit suspended between successive rests, the efforts are further amplified and the conduit itself is increasingly exposed to dynamic loads such as water currents.

Moreover, said solutions impose rather laborious laying and installation methods, indeed they do not allow the launch in line of all support elements of the conduit, thus forcing complex and costly underwater operations to be performed for example, of finishing and/or connection between stretches of separately laid, or launched, continuous conduits, and/or of anchoring of stretches of continuous conduit to the seabed, and also of anchoring of floating buoys and anchors and ballasts to the conduit. This is all made more complex when the seabeds are deep or very deep.

From document WO2014041359A2 is known a pipeline connection device for connecting two portions of a conduit forming a curve path, wherein such a connection device includes a tie-rod to tighten and adjust the curvature radius of the pipeline connection device. A further example of pipeline connection device including a tie-rod is shown in WO2015034267A1.

Known laying methods are for example the "J"-shaped laying method (FIGS. 1A and 1B), in which a pipe laying ship lowers the continuous conduit to be launched in subvertical direction, thus making the piping take on a deformed configuration with a single curvature, having the "J"-shape feature, when it is rested on the seabed, and the "S"-shape laying method (FIG. 1C), in which the continuous conduit to be launched is lowered by means of a launching ramp which makes the continuous conduit take on a deformed dual-curvature configuration having the "S"-shape feature.

Rigid joints are also known, capable of providing fluidic and structural continuity between two stretches of continuous conduit and simultaneously comprising an open branch of joint, exclusively suitable for providing structural continuity to the conduit, for example joints suitable for anchoring a stretch of conduit to the seabed, for example by using a dead body or anchoring screws connected to said open branch of joint. The expression "open branch" of joint means that said joint comprises a branch which is unsuitable for being connected to the continuous conduit and is suitable, e.g., for anchoring to the seabed.

However, the use of such types of joint does not solve the problem, because in any case it imposes stresses of longitudinal structural continuity on the stretches of conduit confluent into the joint.

Solution

It is an object of the present invention to obviate the drawbacks of the prior art and to provide a solution for the need to provide an improved joining device of a continuous conduit for variations in slope of seabeds which is capable of adding flexibility to the continuous conduit while maintaining the fluidic and structural continuity of the continuous conduit.

It is a further particular object of the present invention to provide a joining device of a continuous conduit capable of separating the action of longitudinal structural continuity from the action of fluidic continuity.

It is a further particular object of the present invention to provide a device, and also a method, of joining a continuous conduit which allows easier laying operations with respect to known solutions, also in the presence of seabeds which have escarpments with a variation in slope associated with a long inclined slope, that is a device suitable for the launch in line in a single step of all the elements forming the continuous conduit.

The division of the action of longitudinal structural continuity and the action of fluidic continuity on two separate joining branches connected parallel to each other allows the tensions and the stresses acting on a branching tube to be alleviated in operating conditions and also during the laying process.

Due to the provision of a joining device of a continuous conduit which comprises at least two joints, an upstream joint and a downstream joint, in which said upstream joint is suitable for separating the longitudinal structural continuity and the fluidic continuity of said continuous conduit, and in which said downstream joint is suitable for combining together the longitudinal structural continuity and the fluidic continuity of said continuous conduit along the longitudinal direction, a branching tube, which is no longer obligated to follow the profile of the seabed, may be given an optimized shape for supporting the stresses resulting from the interaction with the underwater environment and resulting from the fluid inside the continuous conduit.

The provision of a joining device of a continuous conduit comprising an upstream joint and a downstream joint gives the joining device and the continuous conduit comprising said joining device improved flexibility, while it ensures both the longitudinal structural continuity and the fluidic continuity of the continuous conduit.

FIGURES

Further features and advantages of the device and method will be apparent from the description provided below of preferred embodiments thereof, given by way of non-limiting example, with reference to the accompanying drawings, in which.

Figure 1A:
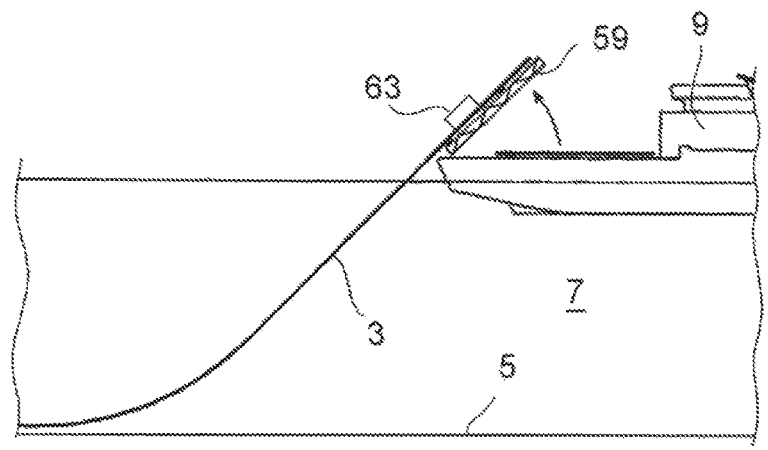
FIGS. 1A and 1B are diagrammatical views showing steps of a possible "J"-shaped laying method of a continuous conduit.
Figure 1B:
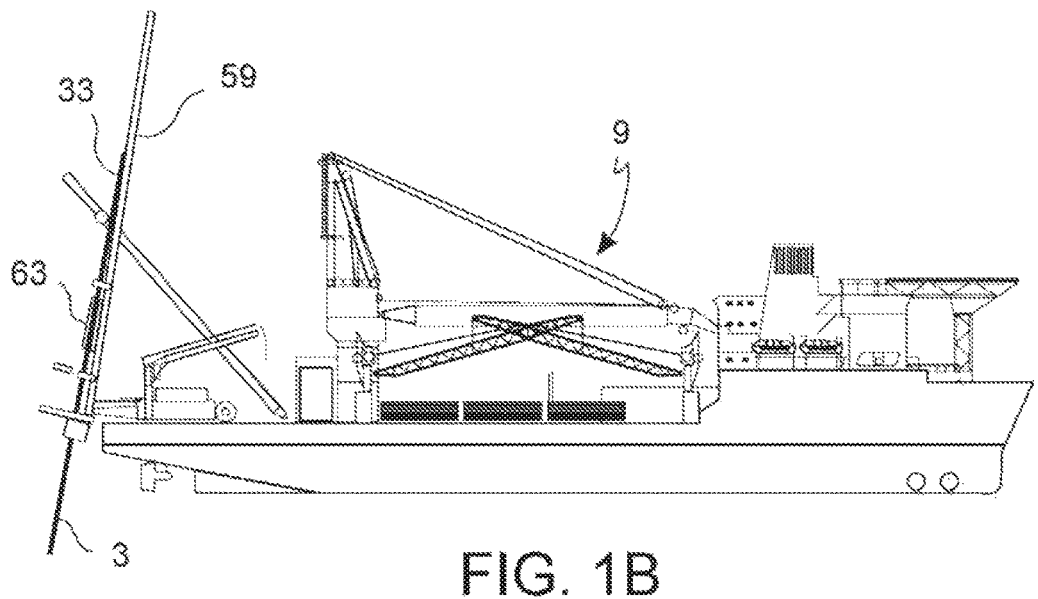
Figure 1C:
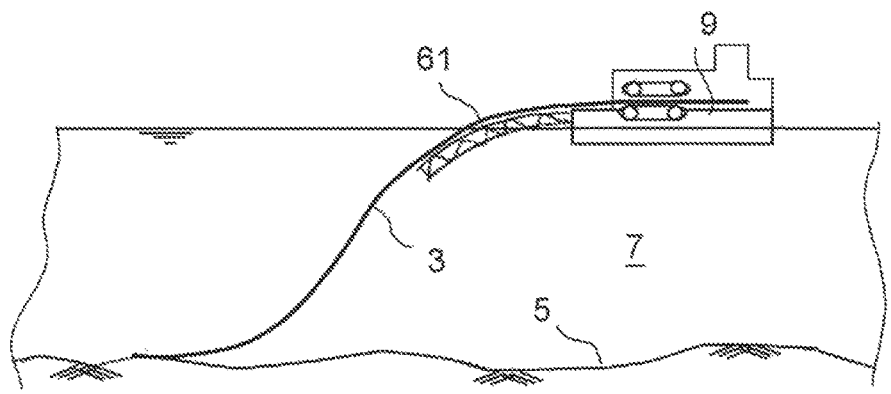
FIG. 1C is a diagrammatical view showing a step of a possible "S"-shaped laying method of a continuous conduit.
Figure 2:
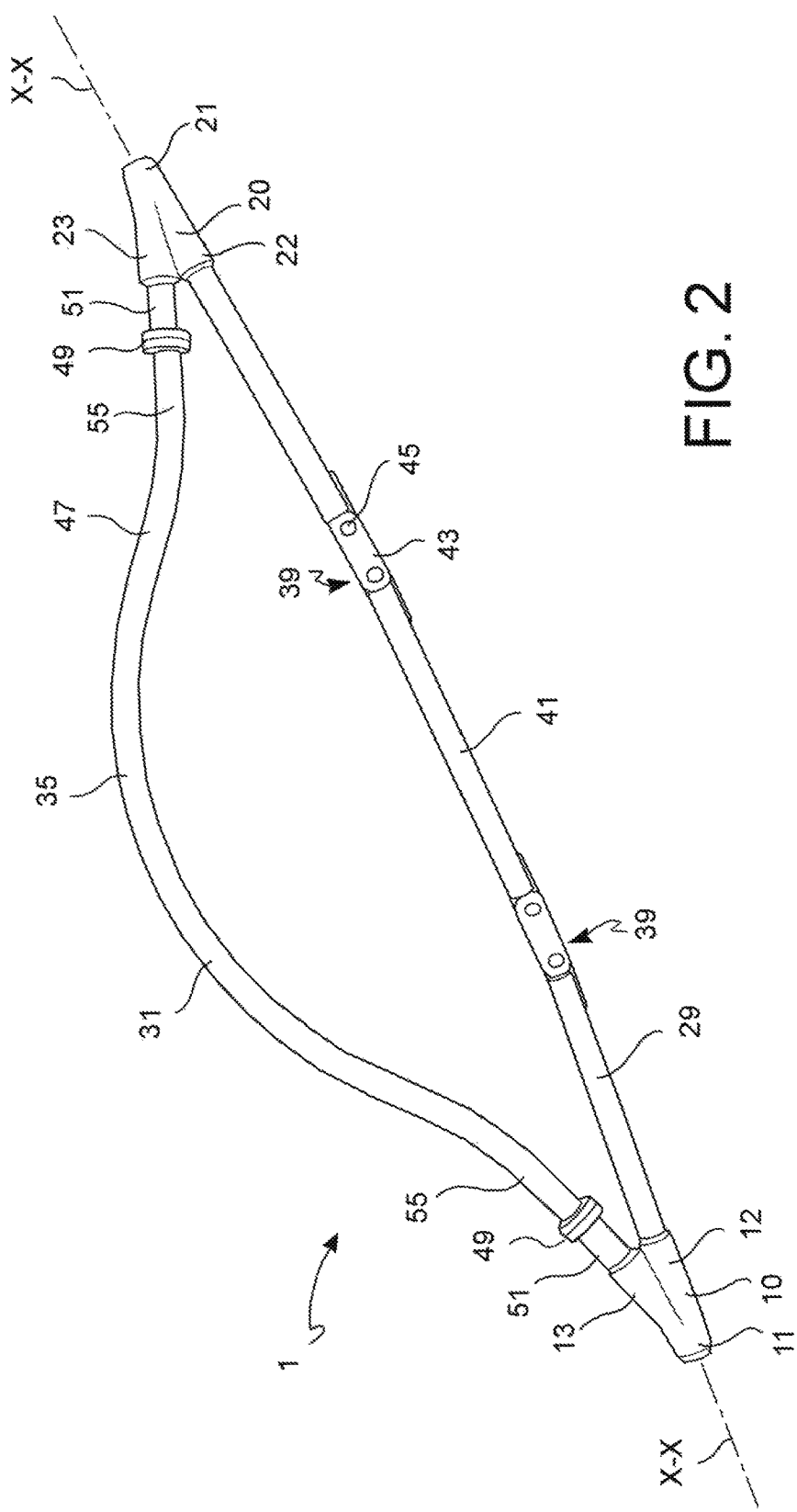
FIG. 2 is a vertical raised view showing a device according to one embodiment of the invention.
Figure 3:
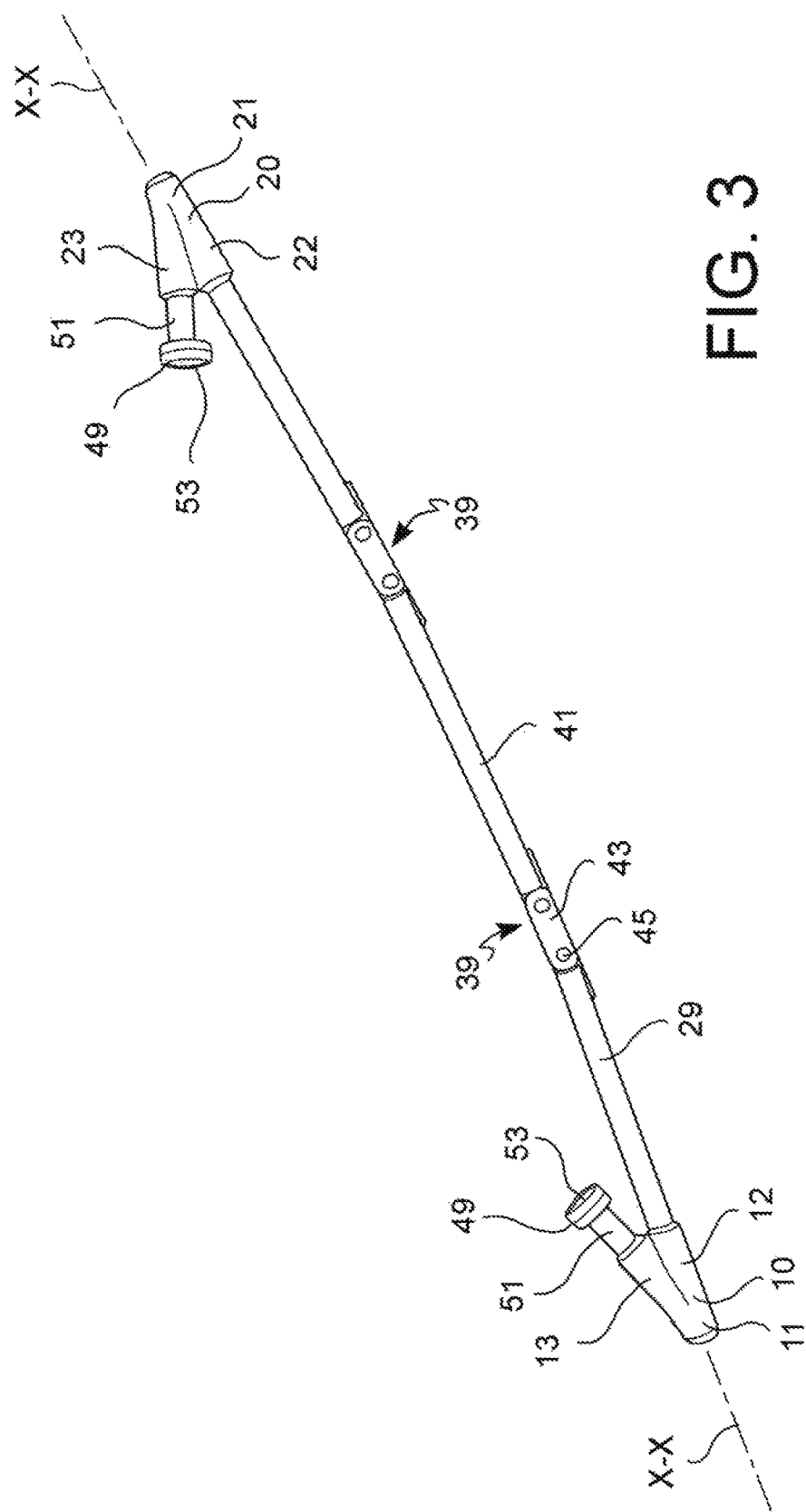
FIG. 3 is a vertical raised view showing a device according to one embodiment of the invention.
Figure 4:
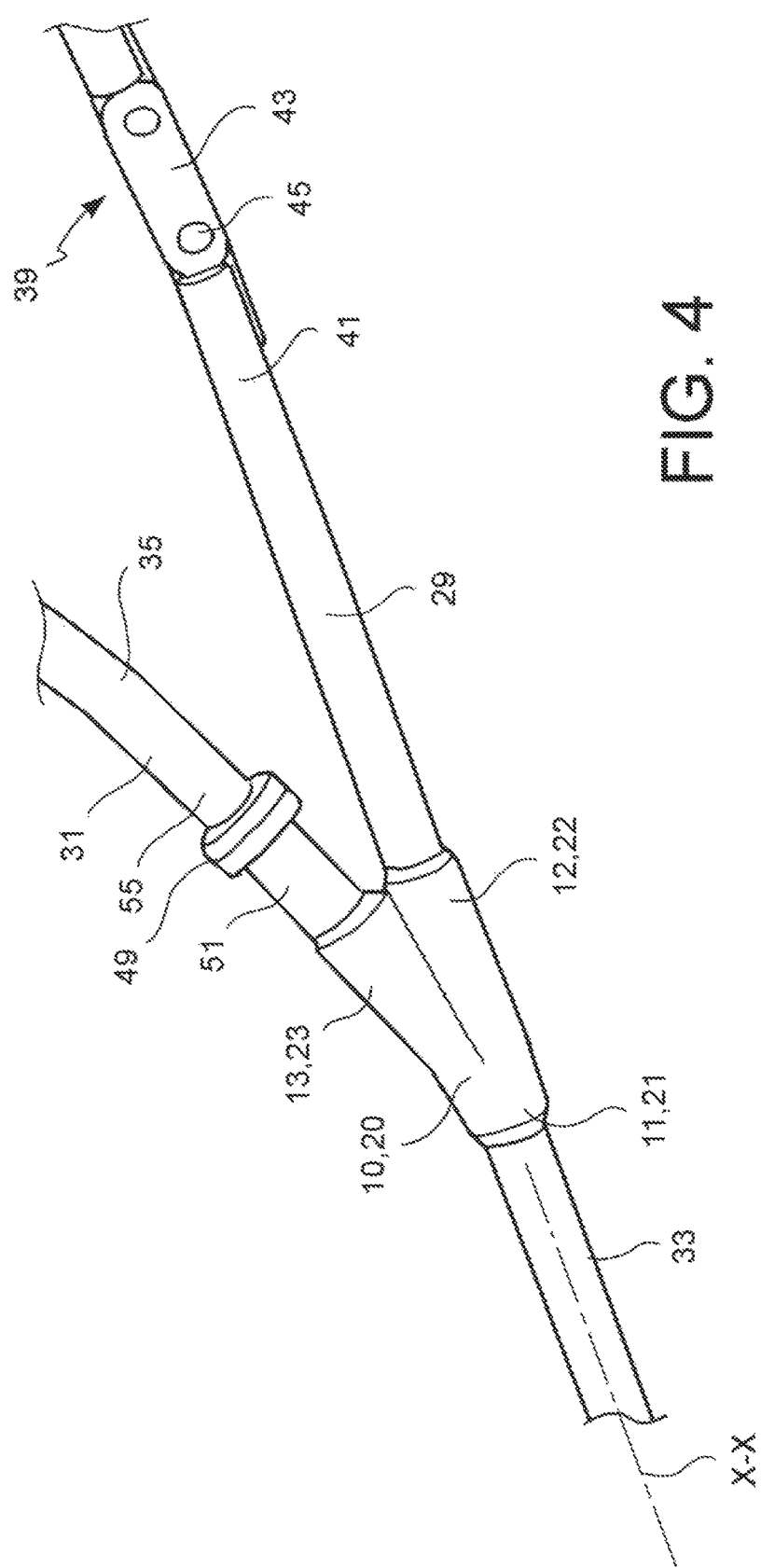
FIG. 4 is an enlarged view of a device according to one embodiment.
Figure 5:
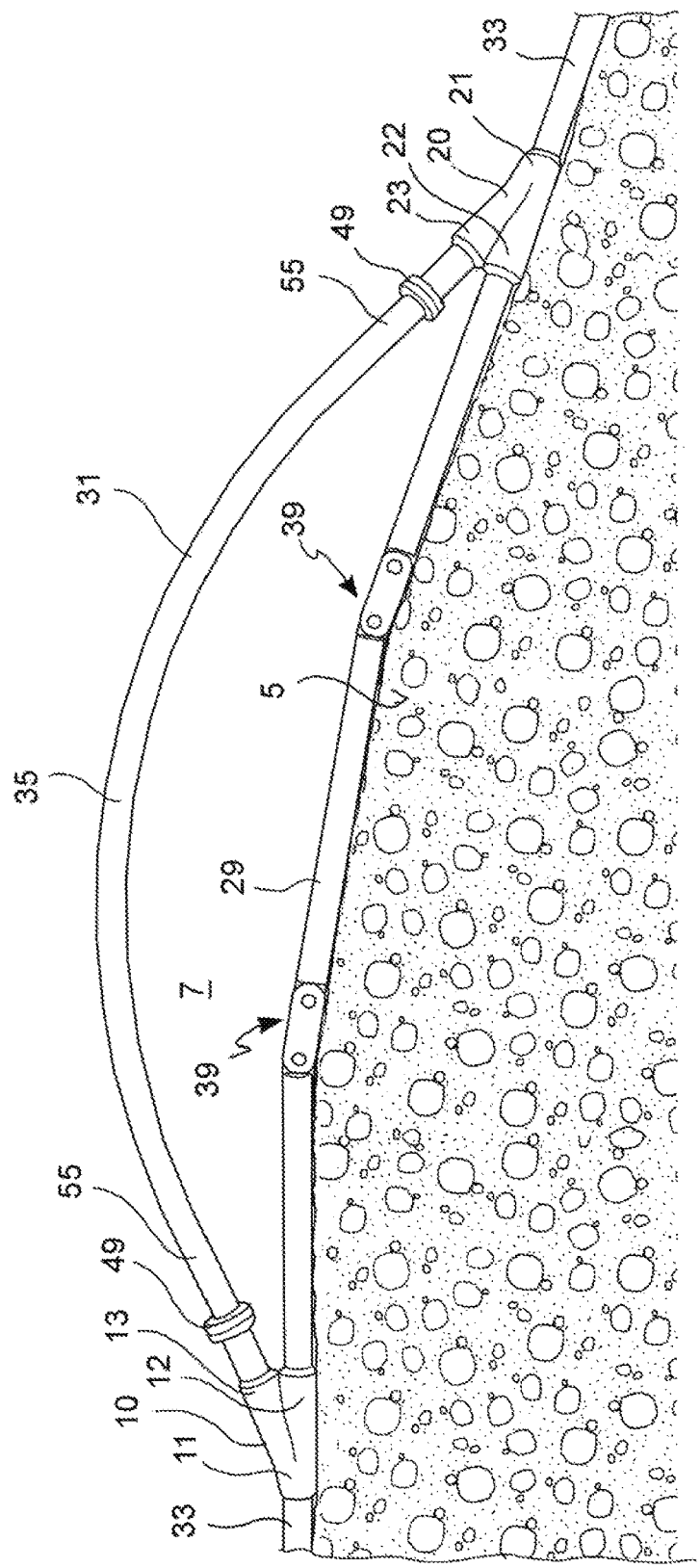
FIG. 5 shows a vertical raised view of an embodiment of a device according to the invention, in operating conditions.
Figure 6:
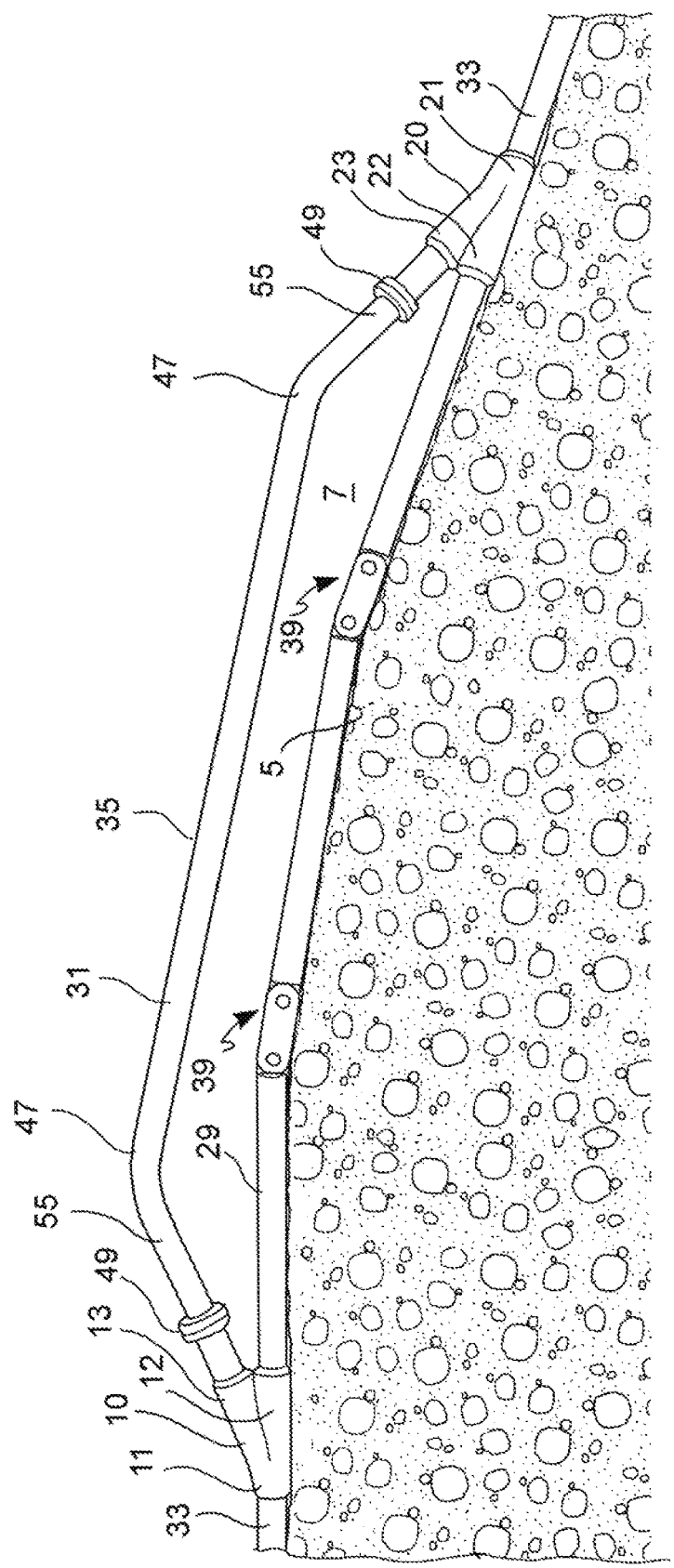
FIG. 6 shows a vertical raised view of an embodiment of a device according to the invention, in operating conditions.
Figure 7A:
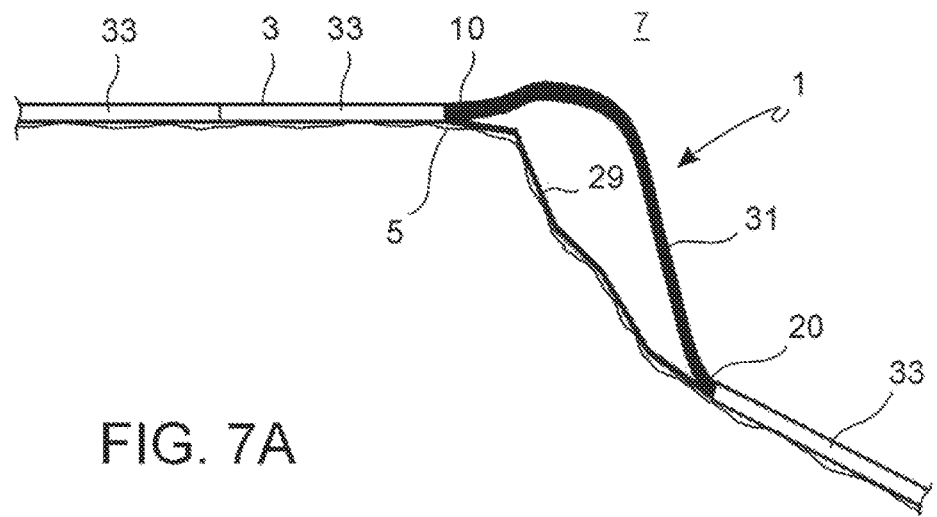
Figure 7B:
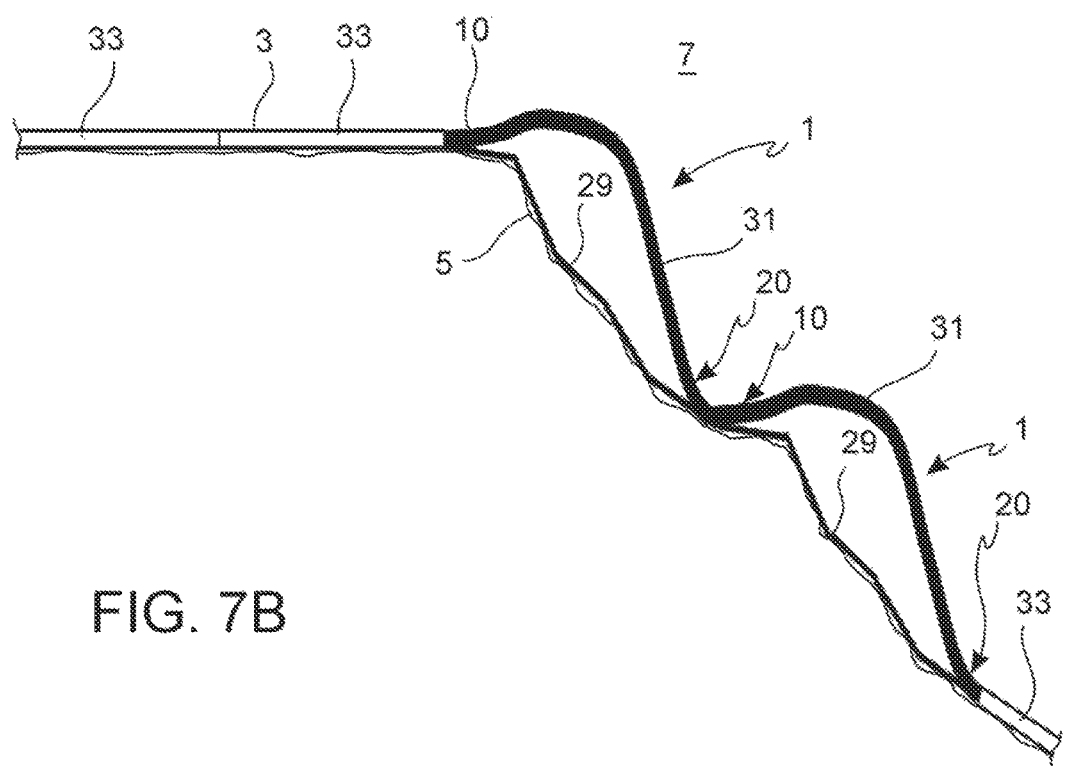
Figure 8:
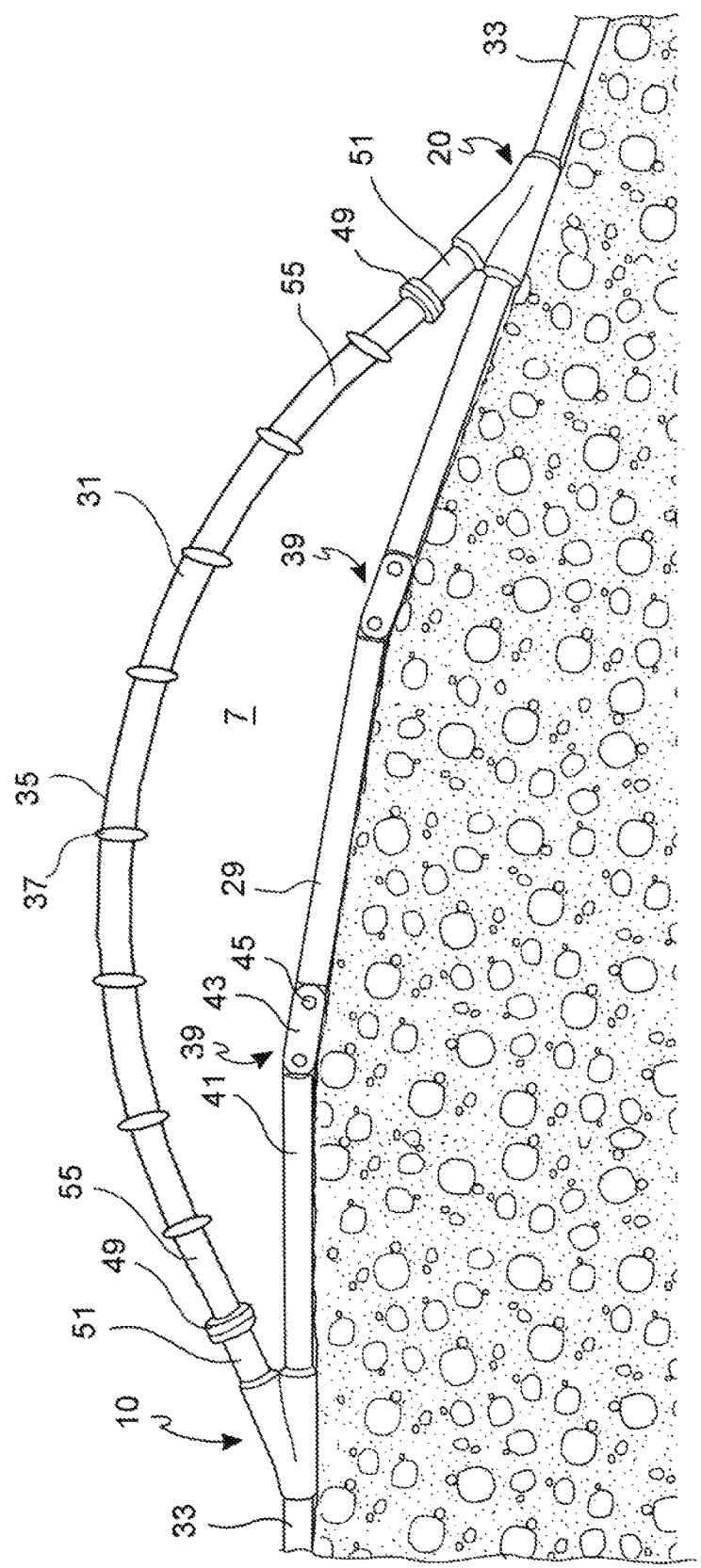

FIGS. 7A and 7B diagrammatically show a continuous conduit comprising at least one device according to one embodiment;

FIG. 8 depicts a vertical raised view of an embodiment of a device according to the invention, in operating conditions.

DESCRIPTION OF SOME PREFERRED EXAMPLE EMBODIMENTS

According to a general embodiment, a joining device 1 of a continuous conduit for changes in slope of seabeds is suitable for connecting at least two pieces 33 forming a continuous conduit 3 to each other, which continuous conduit defines a longitudinal direction X-X substantially coinciding with the longitudinal direction of structural development of said continuous conduit 3. Said continuous conduit 3 has a longitudinal structural continuity and a fluidic continuity.

Said joining device 1 comprises at least two joints 10, 20. Said at least two joints 10, 20 comprise at least one upstream joint 10 and at least one downstream joint 20, in which by following said continuous conduit 3 along said longitudinal direction X-X, said upstream joint 10 and said downstream joint 20 meet, and in which said each of said upstream joint 10 and downstream joint 20 comprises at least one first joining branch 11, 21, at least one second joining branch 12, 22 and at least one third joining branch 13, 23.

Said first joining branch 11, 21 extends along the longitudinal direction X-X and is suitable for providing the longitudinal structural continuity and the fluidic continuity of said continuous conduit 3 and is suitable for connecting with one of said pieces 33 of the continuous conduit 3.

Said second joining branch 12, 22 is suitable for providing the longitudinal structural continuity of said continuous conduit 3.

Said third joining branch 13, 23 is suitable for providing the fluidic continuity of said continuous conduit 3.

Thereby, by passing from said first 11, 21 to said second 12, 22 and third branch 13, 23, said upstream joint 10 separates said longitudinal structural continuity from said fluidic continuity of said continuous conduit 3 and said downstream joint 20 allows said longitudinal structural continuity to be combined together with said fluidic continuity of said continuous conduit 3 by means of the passage from said second 12, 22 and third branches 13, 23 to said first joining branch 11, 21.

Said second joining branch 12, 22 is exclusively suitable for providing the longitudinal structural continuity of said continuous conduit 3, resulting unsuitable for providing the fluidic continuity.

Said joining device 1 further comprises at least one structural connection element 29 suitable for forming a connection of longitudinal structural continuity between the respective second joining branches 12, 22 of said upstream joint 10 and of said downstream joint 20.

Said joining device 1 further comprises at least one branching tube 31, suitable for forming a connection of fluidic continuity between the respective third joining branches 13, 23 of said upstream joint 10 and of said downstream joint 20.

According to one embodiment, each of said first joining branches 11, 21 extends along the longitudinal direction X-X and is suitable for providing longitudinal structural continuity and the fluidic continuity of said continuous conduit 3.

According to one embodiment, each of said second joining branches 12, 22 is exclusively suitable for providing the longitudinal structural continuity of said continuous conduit 3.

According to one embodiment, each of said third joining branches 13, 23 is mainly suitable for providing the fluidic continuity of said continuous conduit 3.

According to one embodiment, said branching tube 31 and said structural connection element 29 are arranged parallel or adjacent to each other, connecting upstream and downstream of said upstream joint 10 and said downstream joint 20, so that said second joining branch 12, 22 and third joining branch 13, 23 of said upstream joint 10 and downstream joint 20 and said branching tube 31 and said structural connection element 29 form a path closed upon itself.

According to one embodiment, the invention provides, inside said continuous conduit 3, a stretch of a continuous conduit which is capable of simultaneously separating the structural function from the fluidic connection by placing two branches in parallel, in which one branch is suitable for exclusively providing the longitudinal structural continuity and the other branch is suitable for mainly providing the fluidic continuity. Said stretch combines together the two functions in the single piece of conduit 33 at the end thereof in which it connects to the continuous conduit 3 again, thus avoiding the branch of longitudinal structural continuity from remaining open, rather thus causing said branch of longitudinal structural continuity to act as element of longitudinal structural continuity for the continuous conduit.

Since the structural and fluidic functions are divided, the ability to adapt perfectly to the rapid changes in slope of the seabed may be introduced on the branch with exclusively structural features, thus focusing the stresses thereon and avoiding dangerous stress peaks on the branch which instead consists of the fluidic continuity, which branch that ensures the fluidic continuity may follow a path which, per se, mechanically stresses it less or not at all.

According to one embodiment, said upstream joint and said downstream joint 20 have their respective second joining branches 12, 22 and their respective third joining branches 13, 33 facing one another, structurally or fluidically.

The term "facing one another" means that said upstream joint 10 and said downstream joint 20 have their respective second joining branches 12, 22 and their respective third joining branches 13, 23 facing one another structurally or fluidically, but does not mean that they are visually facing one another, and therefore in a straight line, rather meaning that said upstream joint 10 and said downstream joint 20 are arranged so as to allow the connection of said second joining branches 12, 22 to one another and said third joining branches 13, 23 to one another, even if the line of longitudinal development of each branch follows a non-rectilinear path.

According to one embodiment, said branching tube 31 and said structural connection body 29 are arranged parallel with respect to said upstream joint 10 and said downstream joint 20.

According to one embodiment, at least one of said first joining branches 11, 21 is suitable for forming a connection of longitudinal structural continuity and of fluidic continuity with a piece of a continuous conduit 33 or with a further joining device of a continuous conduit 3.

According to one embodiment, said longitudinal direction X-X, or direction of structural development of the continuous conduit 3, is defined so as to locally follow the development of the continuous conduit 3 in presence of curves, in other words said longitudinal direction X-X assessed in said first upstream joining branch 11 may be non-parallel with respect to said longitudinal direction X-X assessed in said first downstream joining branch 21.

According to one embodiment, said joining device allows the division of the action of longitudinal structural continuity and the action of fluidic continuity on two separate branches connected parallel to each other in said joints 10, 20, and allows the tensions and the stresses of longitudinal structural continuity acting on said branching tube 31 to be alleviated in operating conditions and also during the laying process.

In other words, the only stresses of longitudinal structural continuity acting on said branching tube 31 are the ones which originate from the longitudinal structural continuity of the branching tube 31 itself, while the stresses of longitudinal structural continuity of the continuous conduit 3 are unloaded onto said structural connection element 29.

According to one embodiment, dynamic stresses act on said branching tube 31, generated by the interaction of the tube with the marine environment such as underwater currents and swirling, and also stresses generated by the fact that said branching tube 31 is constrained in said upstream joint 10 and downstream joint 20, and also stresses caused by the weight of the fluid inside the branching tube 31 and by the weight of the branching tube itself, and also stresses caused by variations of temperature of the fluid inside the branching tube 31.

According to one embodiment, the division of the action of longitudinal structural continuity and the action of fluidic continuity on two separate branches connected parallel to each other in said joints 10, 20 allows the resistance and the flexibility of said branch of fluidic continuity to be increased, length of the suspended stretch of continuous conduit being equal, or the length of said branch of fluidic continuity to be increased, structural resistance of the suspended stretch of continuous conduit being equal.

According to one embodiment, the division of the action of longitudinal structural continuity and the action of fluidic continuity on two separate branches connected parallel to each other in said joints 10, 20 allows the branch of fluidic continuity, or branching tube 31, to be made with materials, systems and shapes which ensure flexibility and the ability to contain the pressurised fluid without having to carry significant axial loads.

According to one embodiment, irrespective of the continuous conduit and of the joining device 1, a joint 10, 20 comprises a first joining branch 11, 21, which extends along the longitudinal direction X-X and is suitable for providing longitudinal structural continuity and the fluidic continuity of said continuous conduit 3, a second joining branch 12, 22 which is exclusively suitable for providing the longitudinal structural continuity of said continuous conduit 3, and a third joining branch 13, 23 which is mainly suitable for providing the fluidic continuity of said continuous conduit 3. A joint 10, 20 of this type is suitable for separating the action of longitudinal structural continuity and the action of fluidic continuity, or may be suitable for combining together the longitudinal structural continuity and the action of fluidic continuity in one piece of continuous conduit 33.

According to one embodiment, said joining device 1 is a device suitable for being connected in series with a further joining device, in other words said first downstream joining branch 21 of said joining device 1 is suitable for being connected with a first upstream joining branch 11 of a further joining device.

According to one embodiment, said branching tube 31 is connected to said third joining branches 13, 23 in an end portion 55 of said branching tube.

According to one embodiment, said structural connection element 29 is constrained to each of said second joining branches 12, 22 so as to transmit at least the action of axial tension of said continuous conduit 3.

According to one embodiment, said structural connection element may be made in the shape of a chain or a tie rod.

According to one embodiment, said structural connection element 29 is suitable for working both under traction and under compression.

According to one embodiment, said structural connection element 29 extends along the longitudinal direction X-X.

According to one embodiment, said structural connection element 29 comprises at least one shaft 41 connected to said second joining branches 12, 22 of said upstream joint 10 and of said downstream joint 20, respectively.

According to one embodiment, said structural connection element 29 comprises at least two shafts 41 connected together through at least one mechanical joint 39 suitable for forming at least one yielding constraint, or articulation, between said at least two shafts 41, so as to adapt said structural connection element 29 to the profile of a seabed 5.

According to one embodiment, said mechanical joint 39 allows the free rotation of said at least two shafts 41 in at least one plane.

According to one embodiment, at least one shaft 41 of said at least two shafts is connected in series to a further portion of structural connection element 29, e.g. a further shaft 41 or a plate 43, by means of an end portion thereof which is coupled with a reciprocally shaped portion of said further shaft or plate 43 so as to form a connection which allows the free rotation of said at least two shafts 41 in a plane and prevents any rotation outside of said plane.

According to one embodiment, said mechanical joint 39 may comprise compensation elements suitable for elastically and/or plastically compensating overstresses of at least one of said at least two shafts 41.

The provision of said compensation elements allows any longitudinal deformation of said structural connection element 29 to be compensated for by moving at least one shaft 41 of said at least two shafts 41. In other words, said compensation elements act like a spring and/or a damper between said at least two shafts 41.

According to one embodiment, said mechanical joint 39 is a hinge.

According to one embodiment, joint 39 may be a hinge during the step of installation, in which said hinge may be locked when the joining device 1 is in operating conditions, in other words, once the joining device 1 rests on seabed 5.

According to one embodiment, said mechanical joint 39 is a double hinge, or a double-acting hinge, suitable for forming a series of two yielding constraints, or articulations, between said at least two shafts 41 arranged separate from each other and in series. According to one embodiment, said structural connection element 29 comprises at least two shafts 41 connected together by means of at least one plate 43, in which said plate 43 comprises at least two seats suitable for constraining said at least two shafts 41 by means of at least two pins 45, so as to form a series of two yielding constraints, or articulations, arranged separate from each other and in series.

The provision of a series of two yielding constraints, or articulations, allows said structural connection element 29 resting on a seabed 5 to follow a sudden unevenness of the seabed, and also localized abrupt variations in slope, such as for example a stepped unevenness.

According to one embodiment, at least one from said upstream joint 10 and downstream joint 20 is a rigid joint, in which the arrangement of said first joining branch 11, 21, second joining branch 12, 22 and third joining branch 13, 23 is locked in spatial orientation.

According to one embodiment, at least one from said upstream joint 10 and downstream joint 20 may comprise at least one flange 49 suitable for forming a reversible, or decouplable connection with at least one from: said branching tube 31 and said piece of continuous conduit 33.

According to one embodiment, at least one of said upstream joint 10 and downstream joint 20 comprises at least one fitting 51 suitable for cooperating with said at least one flange 49 to make accessible said reversible, or decouplable connection with at least one of said branching tube 31 and said piece of continuous conduit 33.

According to one embodiment, at least one of said connections of fluidic continuity and/or of said connections of longitudinal structural continuity is made by means of a welding or welding-brazing process.

According to one embodiment, said branching tube comprises an outer surface 35 suitable for facing a water mass 7 in which said branching tube 31 is immersed, when in operating conditions.

According to one embodiment, said outer surface comprises at least one protuberance 37 suitable for locally mitigating the turbulence of said water mass 7, when in operating conditions.

According to one embodiment, said at least one protuberance 37 has a substantially helical shape which winds on said outer surface 35 of said branching tube 31. According to one embodiment, said at least one protuberance has a substantially ring shape and/or has a faired shape, which surrounds a cross section of said branching tube 37.

Due to the provision of a protuberance 37 on said outer surface 35, the entity of the dynamic stresses due to turbulent motions such as e.g. swirling phenomena of said water mass 7 may be decreased at least in the vicinity of said branching tube 31.

According to one embodiment, said outer surface comprises an anti-corrosion surface coating, suitable for improving the resistance to corrosion of said outer surface 35, in operating conditions.

According to one embodiment, said outer surface 35 comprises at least one cathodic protection device with sacrificial anode suitable for avoiding corrosive phenomena.

According to one embodiment, said outer surface comprises a coating suitable for protecting said branching tube 31 from knocks.

According to one embodiment, said coating suitable for protecting said branching tube 31 from knocks is made of polymeric material.

According to one embodiment, said joining device 1 is suitable for resting on a seabed 5 of said water mass 7.

Said joining device 1 suitable for laying on a seabed 5 is relieved from stresses generated by structural constraints, such as for example distributed anchorages, with said seabed 5.

According to one embodiment, said joining device 1 comprises at least one gasket 53 suitable for isolating the interior of said continuous conduit 3 from said water mass 7. According to one embodiment, said gasket 53 is located between at least one of said upstream joint 10 and said downstream joint 20 and said branching tube 31. According to one embodiment, said gasket 53 is suitable for cooperating with said flange 49 to isolate the interior of said continuous conduit 3 from said water mass 7.

According to one embodiment, said water mass 7 is at least a portion of a sea, an ocean or a salt-water lake; or it is a fresh-water water mass, such as e.g. a lake, basin or a river.

The provision of a joining device 1 suitable for laying on seabed 5 and not fixed or anchored to the seabed, allows to avoid, or at least limit, the need for performing complex underwater operations, for example preparing and also finalizing anchorages, for example by means of making anchoring holes suitable for being coupled with screws or anchoring splines, which could therefore require sophisticated remote-controlled instruments in case of deep or very deep seabeds.

According to one embodiment, said structural connection element 29 is suitable for orienting said upstream joint 10 and downstream joint 20 freebly with respect to each other.

According to one embodiment, said structural connection element 29 is suitable for orienting said upstream joint 10 and downstream joint 20 freely in a plane with respect to each other.

The possibility of orienting said upstream joint and downstream joint 20 freely with respect to each other makes said joining device 1 suitable for resting on seabeds which have a profile with changes in slope and/or particularly irregular, without excessively stressing said structural connection element 29, thus giving said device an optimal level of versatility. Said versatility makes said device suitable for being sized at least according to standards in the field, which is advantageously useful for transport needs, e.g. road transport.

According to one embodiment, said branching tube is a flexible tube, in which said branching tube 31 comprises at least one curved portion 47, and in which said at least one curved portion 47 has a substantially constant radius of curvature or in which said at least one curved portion 47 has at least a change of concavity.

The provision of a dual-curvature curved portion, that is which has at least one change of concavity, allows any deformations along the direction of development of said branching tube 31 to be compensated for, for example thermal expansions due to the variation in temperature of the fluid in motion in the continuous conduit 3.

According to one embodiment, said at least one curved portion 47 is suitable for being made on site.

According to one embodiment, said branching tube is a rigid tube, in which said branching tube 31 comprises at least one curved portion 47 suitable for being prefabricated.

Said branching tube 31 suitable for providing mainly the fluidic continuity is suitable for allowing the design of an optimized curvature, for example so as to minimize the loss of load.

According to one embodiment, said branching tube 31 is suitable for being made mainly with metal material, such as for example steel, tempered steel or iron, and/or polymeric material, such as for example polyethylene, and/or ceramic material and/or composite material.

According to one embodiment, said branching tube 31 is suitable for being subjected to a status of tension in operating conditions.

According to a general embodiment, a continuous conduit 3 comprises a plurality of pieces of continuous conduit 33, in which at least one joining device 1 according to any one of the embodiments described above is inserted in said continuous conduit 3, between two pieces 33.

According to one embodiment, at least two joining devices 1 according to any one of the embodiments described above are inserted in a continuous conduit 3.

According to one embodiment, said at least two joining devices 1 are adjacent.

The provision of said at least two adjacent joining devices 1 inserted between pieces of continuous conduit 33 allows said joining device 1 to be used in seabeds which have changes in slope associated with an inclined profile of any extension.

With reference to the figures and to the description above, a method of joining a continuous conduit 3 for changes in slope of seabeds is described below.

A method for joining a continuous conduit 3 for changes in slope of seabeds comprises the following steps, listed according to a preferred, but not necessary, time order:
  providing at least one joining device 1 according to any one of the embodiments described above;
  providing at least one continuous conduit 3 according to any one of the embodiments described above;
  locally decoupling the longitudinal structural continuity action and the fluidic continuity action of said continuous conduit 3;
  arranging said joining device 1 at changes in slope of the seabed 5.

According to a possible operating method, a method for joining a continuous conduit for changes in slope of seabeds comprises the further step of arranging said structural connection element 29 of said joining device 1 along said continuous conduit so that it is suitable for resting on changes in slope of seabed 5.

According to a possible operating method, a method for joining a continuous conduit 3 for changes in slope of seabeds may comprise at least one of the following further steps:
  analysing the topography of seabed 5;
  connecting at least one said joining device 1 to at least one piece of continuous conduit 33;
  dropping said continuous conduit 3 comprising at least one said joining device 1 into said water mass 7;
  monitoring the laying of said continuous conduit 3 comprising at least one said joining device 1;
  laying at least one portion of said continuous conduit 3 on said seabed 5;
  laying at least one said joining device 1 on said seabed 5 at a change in slope.

According to a possible operating method, a method for joining a continuous conduit 3 for changes in slope of seabeds comprises the further step of mounting said branching tube 31 between said third joining branches 13, 23 before the launch of the continuous conduit 3. According to one embodiment, when said branching tube 31 is mounted between said third joining branches 13, 23 before the launch of the continuous conduit 3, said branching tube 31 is preferably, but not necessarily, a flexible tube.

According to a possible operating method, a method for joining a continuous conduit 3 for changes in slope of seabeds may comprise at least one of the following further steps:

providing a joining device 1 according to any one of the embodiments described above, on board a launching device 9;

connecting a piece of continuous conduit 33 upstream of said joining device 1 and a piece of continuous conduit 33 downstream of said joining device 1 by welding or welding-brazing in a welding station 63 provided on board said launching device 9 so as to form a continuous conduit 3 comprising said joining device 1, according to any one of the embodiments described above;

monitoring the laying of said continuous conduit 3 comprising at least one said joining device 1 by means of electronic instrumentation;

laying said continuous conduit 3 comprising said joining device 1 according to the known "J"-shaped laying method; in other words, lowering said continuous conduit 3 comprising said joining device 1 through a launching tower 59 provided on board said launching device 9 so that said continuous conduit 3 forms a single concavity curve, or "J"-shaped curve, during the laying process.

According to a possible operating method, the topography of the seabed is detected and/or analyzed by means of a detection vehicle, for example a vehicle known with the term "survey vessel".

Alternatively to the step of laying the continuous conduit 3 by means of the "J"-shaped laying method, laying said continuous conduit 3 comprising said joining device 1 according to the known "S"-shaped laying method; in other words, lowering said continuous conduit 3 comprising said joining device 1 by means of the use of a launching ramp 61 provided on board said lauching device 9 so that said continuous conduit 3 forms a curve with change of concavity, or "S"-shaped curve, during the laying process.

According to a possible operating method, a laying, or launching method provides a step of laying the joining device 1 on seabed 3 and does not provide the anchoring of said joining device 1 to seabed 5, nor the use of floating elements.

According to one general embodiment, a joining device 1 of continuous conduit 3 for changes in slope of seabeds comprises at least one joint 10, 20.

Said at least one joint 10, 20 comprises at least one first joining branch 11, 21, at least one second joining branch 12, 22 and at least one third joining branch 13, 23.

Said first joining branch 11, 21 extends along the longitudinal direction X-X and is suitable for providing the longitudinal structural continuity and the fluidic continuity of said continuous conduit 3 and is suitable for connecting with one of said pieces 33 of the continuous conduit 3.

Said second joining branch 12, 22 is suitable for providing the longitudinal structural continuity of said continuous conduit 3.

Said third joining branch 13, 23 is suitable for providing the fluidic continuity of said continuous conduit 3.

Said second joining branch 12, 22 is exclusively suitable for providing the longitudinal structural continuity of said continuous conduit 3, it being unsuitable for providing the fluidic continuity.

According to a possible operating method, said branching tube 31 is mounted between said third joining branches 13, 23 when said continuous conduit 3 is laying on seabed 5.

According to a possible operating method, a method for joining a continuous conduit 3 for changes in slope of seabeds comprises at least one of the following further steps, listed according to a preferred, but not necessary, time order:

providing two joints 10, 20 according to any one of the embodiments described above, connected to a connection element 29;

closing each of said third joining branch 13 of said upstream joint 10 and said third joining branch 23 of said downstream joint 20, respectively, by means of a blind flange;

connecting said connection element 29 to said second joining branches 12, 22, of said upstream joint 10 and of said downstream joint 20, respectively;

laying said connection element 29 connected to said upstream joint 10 and to said downstream joint 20, on seabed 5;

removing said blind flange from at least one from said third joining branch 13 of said upstream joint 10 and said third joining branch 23 of said downstream joint 20;

connecting said branching tube 31 to at least one from said third joining branch 13 of upstream joint 10 and said third joining branch 23 of said downstream joint 20.

A person skilled in the art may make many changes, adaptations and replacements to the embodiments described above or can replace elements with others which are functionally equivalent in order to satisfy contingent needs without however departing from the scope of protection of the appended claims.

LIST OF REFERENCES

1. Joining device
3. Continuous conduit
5. Seabed
7. Water mass
9. Launching device
10. Upstream joint
11. First joining branch (upstream)
12. Second joining branch (upstream)
13. Third joining branch (upstream)
20. Downstream joint
21. First joining branch (downstream)
22. Second joining branch (downstream)
23. Third joining branch (downstream)
29. Structural connection element
31. Branching tube
33. Piece of a continuous conduit
35. Outer surface of branching tube
37. Protuberance
39. Mechanical joint
41. Shaft
43. Plate
45. Pin
47. Curved portion of branching tube
49. Flange
51. Connector
53. Gasket
55. End portion of branching tube
59. Launching superstructure
61. Launching ramp
63. Welding station
X-X. Longitudinal direction, or direction of longitudinal structural continuity of a continuous conduit

The invention claimed is:

1. A joining device of a continuous conduit for changes in slope of seabeds, said continuous conduit defining a longitudinal direction substantially coinciding with a longitudinal direction of structural development of said continuous conduit, said continuous conduit having a longitudinal structural continuity and a fluidic continuity, said joining device connecting together at least two pieces forming a continuous conduit;

said joining device comprising at least two joints, said at least two joints comprising at least one upstream joint and at least one downstream joint, wherein each of said at least one upstream joint and said at least one downstream joint comprises at least one first joining branch, at least one second joining branch and at least one third joining branch;

wherein each of said at least one first joining branch extends along the longitudinal direction and provides the longitudinal structural continuity and the fluidic continuity of said continuous conduit connects with a piece of the continuous conduit; and wherein each of said at least one second joining branch provides the longitudinal structural continuity of said continuous conduit; and wherein said at least one third joining branch provides the fluidic continuity of said continuous conduit; and wherein each of said at least one second joining branch is exclusively for providing the longitudinal structural continuity of said continuous conduit, without providing the fluidic continuity; and wherein at least one from said upstream joint and downstream joint is a rigid joint, in which an arrangement of said first joining branch, said second joining branch and said third joining branch is locked in spatial orientation; and wherein said joining device also comprises at least one structural connection element forming a connection of longitudinal structural continuity between the respective second joining branches of said upstream joint and of said downstream joint;

said structural connection element comprises at least two shafts connected together through at least one mechanical joint forming at least one articulation between said at least two shafts, so as to adapt said structural connection element to a profile of a seabed.

2. The joining device according to claim 1, wherein said joining device further comprises at least one branching tube forming a connection of fluidic continuity between the respective third joining branches of said upstream joint and of said downstream joint.

3. The joining device according to claim 2, wherein said branching tube and said structural connection element are arranged parallel or adjacent to one another, connecting to said upstream joint and said downstream joint, wherein said second joining branch and third joining branch of said upstream joint and downstream joint and said branching tube and said structural connection element form a closed path.

4. The joining device according to claim 2, wherein said branching tube is a flexible tube.

5. The joining device according to claim 2, wherein said branching tube is a rigid tube.

6. The joining device according claim 2, wherein said branching tube comprises at least one curved portion.

7. The joining device according claim 6, wherein said at least one curved portion has a substantially constant radius of curvature.

8. The joining device according claim 6, wherein said at least one curved portion has at least one change of concavity.

9. The joining device according claim 6, wherein at least one from said upstream joint and said downstream joint comprises at least one flange forming a reversible, or decouplable, connection with at least one from: said branching tube and said piece of continuous conduit.

10. The joining device according to claim 1, wherein said structural connection element is constrained to each of said second joining branches so as to transmit at least action of axial tension of said continuous conduit.

11. The joining device according to claim 1, wherein a portion of said structural connection element extends from said second joining branch of said upstream joint aligned with both said second joining branch and said first joining branch of said upstream joint, avoiding alignment with said third joining branch of said upstream joint;

and wherein a portion of said structural connection element extends from said second joining branch of said downstream joint aligned with both said second joining branch and said first joining branch of said downstream joint, avoiding alignment with said third joining branch of said downstream joint; and wherein said at least two shafts comprise three shafts or five shafts.

12. The joining device according to claim 1, wherein said structural connection element extends along the longitudinal direction.

13. The joining device according to claim 1, wherein said mechanical joint allows free rotation of said at least two shafts in at least one plane.

14. The joining device according to claim 1, wherein said mechanical joint comprises compensation elements elastically or plastically compensating overstresses of at least one of said at least two shafts.

15. The joining device according to claim 1, wherein said mechanical joint is a hinge.

16. The joining device according to claim 1, and/or wherein said mechanical joint is a double hinge forming a series of two yielding constraints, or articulations, between said at least two shafts arranged separate from one another and in series.

17. The joining device according to claim 1; wherein said structural connection element orients said upstream joint and downstream joint freely with respect to each other.

18. A continuous conduit comprising a plurality of pieces of continuous conduit, wherein in said continuous conduit at least one joining device according to claim 1 is inserted between two pieces.

19. The continuous conduit according to claim 18, wherein at least two joining devices are inserted;

wherein said at least two joining devices are adjacent.

20. A method for joining a continuous conduit for changes in slope of seabeds, comprising the following steps:

providing at least one joining device according to claim 1;

providing at least one continuous conduit;

locally decoupling longitudinal structural continuity action and fluidic continuity action of said continuous conduit;

arranging said joining device at changes in slope of the seabed.

21. The method according to claim 20, comprising the following further steps:

arranging said structural connection element of said joining device along said continuous conduit so that said structural connection element is resting on changes in slope of the seabed.

* * * * *